United States Patent Office 3,499,769
Patented Mar. 10, 1970

3,499,769
PROCESSES FOR PRODUCING STRAWBERRY FLAVOR COMPOSITIONS AND PRODUCTS
Philip deC. Kratz, Rumson, and Louis J. Strasburger, Elizabeth, N.J., assignors to International Flavors and Fragrances, Inc., New York, N.Y., a corporation of New York
No Drawing. Filed Sept. 14, 1966, Ser. No. 579,228
Int. Cl. A23l 1/22
U.S. Cl. 99—140
8 Claims

ABSTRACT OF THE DISCLOSURE

Processes for imparting a fresh fruit flavor, particularly strawberry flavor, to foods by adding a small amount of 2-methyl-2-pentenoic acid, as well as flavoring concentrate compositions and food compositions prepared with such 2-methyl-2-pentenoic acid.

---

This invention relates to novel products and to the processes for preparing them, and more particularly, it relates to methods of imparting fresh fruit flavor and aroma to materials by adding alkyl-substituted alkenoic acids thereto and to the products so obtained.

There are many different types of foods possessing fresh fruit and particularly berry flavor, either naturally or as a result of added flavoring materials. Many of the highly desirable fresh fruit flavors are troublesome to reproduce with manufactured flavoring materials, and one of the most popular and one of the more difficult satisfactorily to reproduce is strawberry. There are many formulas for strawberry flavors and flavor concentrates and strawberry-flavored candies, beverages, dessert foods and the like, but the great majority of these are lacking in an important nuance or character which is found in fresh strawberries themselves.

This invention provides methods for preparing foodstuffs having superior fresh fruit flavor and aroma and the products so obtained.

Further and more specific objects, features and advantages will clearly appear from the detailed description given below.

The invention accordingly comprises the novel compositions and component mixtures comprised in such compositions, as well as the novel processes and steps of processes according to which such compositions can be manufactured, specific embodiments of which are described hereinafter by way of example and in accordance with what is now considered the preferred manner of practicing the invention.

Briefly, the methods of the invention for imparting fresh fruit flavor character to materials comprise adding small amounts of 2-alkyl-2-pentenoic acids effective to impart the required flavor character and/or other organoleptic properties to such materials. This invention also encompasses food compositions comprising edible materials in combination with small but effective amounts of 2-alkyl-2-pentenoic acids to impart the desired flavor to the compositions.

The preferred 2-alkyl-2-pentenoic acid for use in this invention is 2-methyl-2-pentenoic acid having the structural formula:

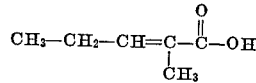

This material provides a sweet, fruity, berry-like acidic flavor and aroma. In a purified form suited for use in this invention it is a clear, water-white, mobile liquid with an $n_D{}^{25}$ of about 1.4572. Pure or commercially pure material can be utilized, and it is preferred that it contain at least about 90% 2-methyl-2-pentenoic acid. The acid can suitably be prepared by a number of processes such as treatment of 2-methyl-pentenal with silver oxide or silver nitrate and an alkali, oxidation of 2-methyl-2-pentenal with dichromate, treatment of 2-methyl-1-pentene with nitrogen tetroxide, heating 2-hydroxy-2-methylpetanoic acid and the like. The material produced according to any of these processes can then be further purified as necessary by conventional techniques such as solvent extraction, distillation, fractional crystallization and the like. A suitable preparation of 2-methyl-2-pentenoic acid for use in this invention is shown hereinafter. All parts, proportions, percentages, and ratios herein are by weight, unless otherwise indicated.

The processes of this invention are particularly applicable to foods and foodstuffs, and as used herein, it will be understood that foods and foodstuffs include both solids and liquids. Exemplary of foods into which the flavoring material and concentrates of this invention can be incorporated are carbonated and non-carbonated beverages, powders or liquids for use in the preparation of carbonated or non-carbonated beverages, puddings, ice cream, mellorine, gelatin desserts, rock, hard and starch candies and confections, centers for chocolates, icings, pie fillings, syrups for sundaes, breakfast foods, fruit fillings for pastries and the like. It will be appreciated that the 2-methyl-2-pentenoic acid can also be utilized in natural fruit products such as strawberry products, and the like where the flavor has been weakened in processing or the natural product has a weak flavor which would be benefited by enhancement.

While the methylpentenoic acid can be added directly to foods to which the flavor is to be imparted, only very small quantities, on the order of some parts per million, are needed and accordingly it is generally preferred to combine the acid with other adjuvants such as carriers or flavoring ingredients and the use of the methylpentenoic acid with flavoring ingredients to form flavor concentrates is preferred, as further described below. These concentrates can then be added either directly to the food or combined with a carrier material and then added to the food. The methylpentenoic acid is preferably added to the food in conjunction with flavor ingredients which aid in imparting the desired strawberry character to the final food composition.

The concentrates according to this invention are prepared by admixing the methylpentenoic acid with the other flavoring materials so that the acid comprises from about one to about 20% of the concentrate. Concentrates containing from about 5 to about 15% of the 2-methyl-2-pentenoic acid are preferred. Suitable flavoring materials for use in the concentrates of this invention are esters, preferably lower alkyl esters such as ethyl butyrate, isoamyl butyrate and the like, ethers such as naphthyl ethyl ether, aldehydes such as vanillin, alcohols including terpene alcohols such as geraniol, ketones such as diacetyl, organic acids including aromatic acids such as cinnamic acid, essential oils such as oil of cinnamon and the like, and lactones such as decalactone. Glycidates are well-recognized constituents of strawberry flavoring materials and are preferred ingredients in the concentrate in certain aspects of this invention.

It will be understood that the concentrates according to this invention need not contain all of the aforementioned classes of flavoring materials, and it should further be understood that the foregoing types of materials can be bolstered, modified or enhanced by the addition of still other materials depending upon the particular flavor character desired, the processing conditions of the food composition, type and duration of storage, and the type of foodstuff into which the flavor is to be incorporated. It will also be understood that whatever other ingredients or adjuvants the concentrates of this invention contain, 2-methyl-2-pentenoic acid must be present if the advantages herein described are to be obtained.

It will be understood by those skilled in the art that 2-methyl-2-pentenoic acid can also be used to benefit a wide variety of flavoring materials which require a fresh fruit flavor. Thus, it has also been found beneficial to incorporate 2-methyl-2-pentenoic acid into fruit flavors such as apricot, prune, pineapple and the like. When the acid is used in flavors other than strawberry, it is used in amounts in the concentrates and in the finished foodstuffs in the same manner as the strawberry. The types and/or proportions of the adjuvants and other materials is also varied to obtain the required flavor character.

The amount of 2-methyl-2-pentenoic acid used in the food compositions of this invention will vary according to the type of product, its processing conditions both before and after the acid and/or other flavors are added, the storage conditions under which it is to be kept, and the like. It is generally preferred to use relatively large amounts of 2-methyl-2-pentenoic acid in hard candies, while somewhat smaller quantities can be used in soft candies such as cream fillings, dessert items such as puddings, gelatin desserts and the like. Lesser quantities of the pentenoic acid can be used in beverages. It is generally found that the 2-methyl-2-pentenoic acid can be present in foodstuffs in amounts of from about 0.5 to about 25 parts per million. Amounts greater than these are uneconomical and in some instances such greater amounts of the material result in a flavor which is too intense and unacceptable to the consumer. When smaller quantities than set forth above are used, the contribution of the methylpentenoic acid to the flavor of the material tends to become lost and the advantages of the present invention are not wholly realized.

It has further been found that the amount of methylpentenoic acid to be used in candies and other foods processed at relatively high temperatures ranges from about 5 to 20 parts per million, and the amount to be used in dessert-type foods such as gelatin desserts and puddings ranges from about 3 to about 10 parts per million. Amounts of the acid on the order of from about 0.5 to about 4 parts per million are suited for use in beverages.

As set forth above, the concentrates include other flavoring materials used in conjunction with the 2-methyl-2-pentenoic acid. In many cases it is difficult homogeneously to incorporate these concentrates into foods, and it is accordingly preferred to utilize a carrier in conjunction with the acid according to this invention. The carriers are suitably solids or liquids and should be non-toxic, edible, essentially flavorless materials which are inert to the 2-methyl-2-pentenoic acid and any flavoring materials or other adjuvants with which it is combined. The flavor of the carrier is not important if it is subsequently removed during further processing of the food. The volatility and other properties of the carrier can be important, depending upon the use to which the flavor is to be put. If the carrier is a component of the finished product, as a syrup would be in a candy for example, then it might be required to have a relatively low volatility. On the other hand, where the carrier has a definite unwanted odor of its own, it should be readily volatilized.

The carriers can be solvents for the concentrate and the 2-methyl-2-pentenoic acid such as sugar syrups, mono- and polyhydric alcohols such as ethyl alcohol, glycerin, and glycols such as propylene glycol, glycerin derivatives such as triacetin and the like. The carriers can also be non-solvents or weak solvents such as water or aqueous liquids used in conjunction with an emulsifier, if necessary, to form emulsions, suspensions or dispersions. Suitable emulsifiers include vegetable gums such as arabic, acacia, guar, karaya, tragacanth and the like, pectin, seaweed and other extractives such as carrageenan, alginates and the like, gelatin, cellulose derivatives such as methyl cellulose, sodium carboxy methyl cellulose, methyl ethyl cellulose, and the like, starches and starch derivatives such as dextrin and the like. Solid carriers for use in this invention include spray-dried emulsions, sugar, dextrose and the like, and encapsulated materials.

It will further be understood that the 2-methyl-2-pentenoic acid is useful in the preparation of fragrance materials having excellent strawberry and other fresh fruit odors. Such fresh fruit fragrances are useful for incorporation in candles, aerosols, and the like.

The following examples are given to illustrate preferred embodiments of the invention as it is now preferred to practice it. It will be understood that these examples are illustrative and the invention is not to be considered as restricted thereto except as indicated in the appended claims.

EXAMPLE I

A purified sample of 2-methyl-2-pentenoic acid is prepared by the oxidation of 2-methyl-2-pentenal in the presence of silver oxide and sodium hydroxide. After distillation the methylpentenoic acid has a boiling point of 59° C. at 0.2 mm. Hg, an index of acidity of 98.9%, a Maschmeijer value of 2.3%, and an $n_D^{25}$ of 1.4572. It is a water-white mobile liquid.

The following concentrate is prepared.

| Ingredient: | Percent |
|---|---|
| Geraniol | 1.00 |
| Ethyl methyl phenyl glycidate | 3.33 |
| 2-methyl-2-pentenoic acid prepared as above | 4.77 |
| Vanillin | 5.66 |
| Ethyl pelargonate | 13.06 |
| Isoamyl acetate | 14.00 |
| Ethyl butyrate | 58.18 |

EXAMPLE II

Another concentrate is prepared as follows.

| Ingredient: | Percent |
|---|---|
| Naphthyl ethyl ether | 0.96 |
| Vanillin | 2.66 |
| Ethyl methyl phenyl glycidate | 2.88 |
| 2-methyl-2-pentenoic acid | 4.90 |
| Ethyl acetate | 9.58 |
| Isoamyl acetate | 12.25 |
| Ethyl butyrate | 26.20 |
| Isoamyl butyrate | 40.57 |

EXAMPLE III

The concentrate prepared in Example I is dissolved in 4 volumes of propylene glycol and the mixture is added to a hard candy melt at the rate of 1.5 oz. of the concentrate solution per 100 lbs. of melt. After the finished candy has been produced, it is found to have an excellent strawberry flavor. When the candy is compared with candy made under the same conditions, but without 2-methyl-2-pentenoic acid in the concentrate, it is found to have an inferior strawberry flavor.

EXAMPLE IV

The propylene glycol solution of the concentrate as prepared in Example III is added to a simple syrup at the rate of ⅛ oz. per gallon of syrup. The syrup is acidified by the addition of 1.5 oz. of 50% aqueous citric acid solution to each gallon of syrup. A carbonated beverage is prepared by admixing one oz. of the flavored, acidified syrup with 5 oz. of carbonated water. The beverage so prepared has an excellent fresh strawberry flavor, and is found to be markedly superior to a beverage prepared in the same manner but without the 2-methyl-2-pentenoic acid.

EXAMPLE V

The flavor concentrate prepared in Example II is admixed with gum arabic and in the proportion of 7 lbs. of concentrate to 28 lbs. of gum arabic in 65 lbs. of water, and the aqueous mixture is spray-dried. The flavor concentrate-carrier combination so obtained is then added to a gelatin dessert mix in the ratio of 1 oz. of spray-dried material to 100 lbs. of dessert mix powder. The gelatin dessert produced from the mix has an excellent strawberry flavor and is markedly superior to a gelatin dessert prepared in the same manner without the 2-methyl-2-pentenoic acid in the concentrate.

What is claimed:

1. A process for preparing a food composition which comprises adding to a food a small amount of 2-methyl-2-pentenoic acid sufficient to impart a fresh fruit flavor character to the composition.

2. The process of claim 1 wherein the amount of acid is from about 0.5 to about 25 parts per million of the food.

3. A process for preparing a food composition which composition which comprises adding to a food a strawberry flavor concentrate consisting essentially of (1) at least one strawberry flavoring material selected from the group of lower alkyl esters, naphthyl lower alkyl ethers, vanillin, terpene alcohols, lower alkyl ketones and aromatic organic acids and (2) an amount of 2-methyl-2-pentenoic acid sufficient to impart a fresh strawberry character to the composition.

4. A process according to claim 3 wherein the amount of 2-methyl-2-pentenoic acid is from about 1 to about 20 percent of the concentrate.

5. The process of claim 4 wherein the concentrate is admixed with a carrier prior to addition to the composition.

6. A food composition consisting essentially of a foodstuff and a small amount of 2-methyl-2-pentenoic acid sufficient to impart a fresh fruit flavor character to the composition.

7. The composition of claim 6 wherein the amount of acid is from about 0.5 to about 25 parts per million of the composition.

8. A strawberry flavoring concentrate composition consisting essentially of an effective amount of 2-methyl-2-pentenoic acid and at least one adjuvant selected from the group consisting of flavor materials and flavor carriers.

References Cited

Chemical Abstracts, vol. 63, 1965, p. 500 g.

Chemicals Used In Food Processing, National Research Council, Publication #1274, 1965, p. 172.

MAURICE W. GREENSTEIN, Primary Examiner

U.S. Cl. X.R.

260—526